(12) United States Patent
Grattan et al.

(10) Patent No.: US 8,906,202 B2
(45) Date of Patent: *Dec. 9, 2014

(54) METHOD OF DETECTING AND REDUCING CONTAMINATION IN PAPERMAKING BOILER SYSTEMS

(75) Inventors: David A. Grattan, Bolingbrook, IL (US); Peter D. Hicks, Aurora, IL (US); George T. Totura, Naperville, IL (US)

(73) Assignee: Nalco Company, Naperville, IL (US)

( * ) Notice: Subject to any disclaimer, the term of this patent is extended or adjusted under 35 U.S.C. 154(b) by 905 days.

This patent is subject to a terminal disclaimer.

(21) Appl. No.: 12/428,792

(22) Filed: Apr. 23, 2009

(65) Prior Publication Data

US 2010/0269996 A1  Oct. 28, 2010

Related U.S. Application Data

(63) Continuation-in-part of application No. 11/852,695, filed on Sep. 10, 2007, now Pat. No. 7,998,352, and a continuation-in-part of application No. 11/852,616, filed on Sep. 10, 2007, now Pat. No. 7,951,298, and a continuation-in-part of application No. 11/782,246, filed on Jul. 24, 2007, now Pat. No. 7,955,853.

(51) Int. Cl.
| | |
|---|---|
| *G08B 21/00* | (2006.01) |
| *C02F 1/00* | (2006.01) |
| *C23F 11/08* | (2006.01) |
| *F22B 37/02* | (2006.01) |
| *C02F 103/28* | (2006.01) |

(52) U.S. Cl.
CPC ............. *C23F 11/08* (2013.01); *C02F 2303/08* (2013.01); *C02F 2209/04* (2013.01); *C02F 2103/28* (2013.01); *C02F 2209/06* (2013.01); *C02F 1/008* (2013.01); *F22B 37/025* (2013.01)
USPC ........................... 162/198; 162/252; 210/696

(58) Field of Classification Search
USPC .................................. 162/198, 252; 210/696
See application file for complete search history.

(56) References Cited

U.S. PATENT DOCUMENTS 3,748,224 A * 7/1973 Tillie et al.
4,261,803 A 4/1981 Suhara et al.
(Continued)

FOREIGN PATENT DOCUMENTS

JP 10213562 8/1998
JP 2003254503 9/2003
(Continued)

OTHER PUBLICATIONS

Buecker B., "Water Treatment: The Continuing Battle Against FAC," Power Engineering, Pennwell Publishing Co., Tulsa, OK, pp. 32-34, vol. 106, No. 9, Sep. 1, 2002.

(Continued)

*Primary Examiner* — Jacob Thomas Minskey
(74) *Attorney, Agent, or Firm* — Leydig, Voit & Mayer, Ltd.

(57) ABSTRACT

This invention relates to a method and system for detecting contamination of boiler condensate and/or boiler feedwater in a papermaking process. The method includes measuring an oxidation-reduction potential at one or more locations in the boiler condensate and/or the boiler feedwater of the papermaking process with one or more corrosion stress monitoring devices. A controller is operable to assess whether the measured or a calculated oxidation-reduction potential is within an optimum range. The controller is operable to cause transmission of a signal to direct feeding an effective amount of one or more reductants and/or one or more pH-controlling chemicals into the boiler feedwater and/or one or more a satellite feed locations of the papermaking process.

17 Claims, 5 Drawing Sheets

(56) References Cited

U.S. PATENT DOCUMENTS

| | | | |
|---|---|---|---|
| 4,269,717 | A | 5/1981 | Slovinsky |
| 4,574,071 | A | 3/1986 | DeSilva et al. |
| 4,648,043 | A | 3/1987 | O'Leary |
| 4,775,005 | A | 10/1988 | Beyer et al. |
| 4,830,757 | A | 5/1989 | Lynch et al. |
| 5,236,845 | A | 8/1993 | Pierce et al. |
| 5,238,846 | A | 8/1993 | Aucutt |
| 5,243,297 | A | 9/1993 | Perkins et al. |
| 5,268,092 | A | 12/1993 | Eden |
| 5,332,494 | A | 7/1994 | Eden et al. |
| 5,342,510 | A | 8/1994 | Eden et al. |
| 5,348,664 | A | 9/1994 | Kim et al. |
| 5,422,014 | A | 6/1995 | Allen et al. |
| 5,470,484 | A | 11/1995 | McNeel |
| 5,747,342 | A | 5/1998 | Zupanovich |
| 5,855,791 | A | 1/1999 | Hays et al. |
| 6,068,012 | A * | 5/2000 | Beardwood et al. ............ 137/3 |
| 6,077,445 | A | 6/2000 | Ascolese |
| 6,336,058 | B1 | 1/2002 | Fowee |
| 6,350,376 | B1 | 2/2002 | Imaoka et al. |
| 6,391,256 | B1 | 5/2002 | Moon et al. |
| 6,402,984 | B1 | 6/2002 | Nakajima et al. |
| 6,409,926 | B1 | 6/2002 | Martin |
| 6,418,958 | B1 | 7/2002 | Rossi et al. |
| 6,436,711 | B1 | 8/2002 | Davis et al. |
| 6,510,368 | B1 | 1/2003 | Beardwood et al. |
| 6,566,139 | B2 | 5/2003 | Davis et al. |
| 6,587,753 | B2 | 7/2003 | Fowee |
| 6,609,070 | B1 | 8/2003 | Lueck |
| 6,620,315 | B2 | 9/2003 | Martin |
| 6,813,532 | B2 | 11/2004 | Eryurek et al. |
| 7,141,175 | B2 | 11/2006 | Verma |
| 7,208,117 | B2 | 4/2007 | Hays et al. |
| 7,951,298 | B2 * | 5/2011 | Hicks et al. ............ 210/746 |
| 7,955,853 | B2 * | 6/2011 | Hicks et al. ............ 436/6 |
| 7,998,352 | B2 * | 8/2011 | Hicks et al. ............ 210/746 |
| 2003/0004681 | A1 | 1/2003 | Fandrich et al. |
| 2006/0006122 | A1 | 1/2006 | Burns et al. |
| 2006/0157420 | A1 * | 7/2006 | Hays et al. ............ 210/696 |
| 2006/0169646 | A1 * | 8/2006 | Andree et al. ............ 210/739 |
| 2006/0182651 | A1 * | 8/2006 | Bailey et al. ............ 422/3 |
| 2008/0179179 | A1 | 7/2008 | Hicks |
| 2008/0202553 | A1 | 8/2008 | Hicks |
| 2009/0030553 | A1 * | 1/2009 | Hicks et al. ............ 700/266 |
| 2009/0065439 | A1 * | 3/2009 | Hicks et al. ............ 210/696 |
| 2009/0065440 | A1 * | 3/2009 | Hicks et al. ............ 210/696 |
| 2010/0109885 | A1 | 5/2010 | Blokker |

FOREIGN PATENT DOCUMENTS

| | | |
|---|---|---|
| JP | 2005233737 | 9/2005 |
| WO | 0159535 | 8/2001 |
| WO | 02101344 | 12/2002 |

OTHER PUBLICATIONS

Haag, J. et al., "On-Line Measurement of Redox and Corrosion Potentials in Water for PWR Steam Generators," Kraftwerkstechnik, Kraftwerkstechnik GMbH, Essen, DE, pp. 236-241, vol. 70, No. 3, Mar. 1, 1990.

Niedrach, L. W., "Electrodes for Potential Measurements in Aqueous Systems at High Temperatures and Pressures,"Angewandte Chemie—International Edition in English, pp. 161-169, vol. 26, No. 3, Mar. 1987.

Uchino et al., "Study on the Practical Application of a Method for Corrosion Potential Measurement in a Water Quality Monitoring System used During Combined Water Treatment," PowerPlant Chemistry, pp. 511-517,vol. 3, No. 9, 2001.

Margulova, T. Kh. et al. "Conditions of dosing oxygen and hydrogen peroxide into the condensate of power units of supercriitical parameters." (Abstract), Teploenergetika (Moscow), 55-9, (6) 1977.

Pike, T.H. et al. "An Improved Method for Monitoring Low Concentrations of Volatile Oxygen Scavengers", Iwc, pp. 64-67, Jan. 2008.

Dooley, B. et al. "ORP—The Real Story for Fossil Plants", PowerPlant Chemistry, pp. 5-15, 5 (1), 2003.

Buecker B., "Water Treatment: The Continuing Battle Against FAC," Power Engineering, Penwell Publishing Co., Tulsa, OK, pp. 32-34, vol. 106, No. 9, Sep. 1, 2002.

Dedekind et al., "Oxygenated Feedwater Treatment at the World's Largest Fossil Fossil Fired Power Plant—Beware the Pitfall," Power Plant Chemistry, vol. 3, No. 11, Nov. 2001.

Filer, "Power Plant Chemistry Measurement Advancements: Oxidation Reduction Potential," Ultrapure Water, Nov. 1998.

Haag, J. et al., "On-Line Measurement of Redox and Corrosion Potentials in Water for PWR Steam Generators," Kraftwerkstechnik, Kraftwerkstechnik GmbH, Essien, DE, pp. 236-241, vol. 70, No. 3, Mar. 1, 1990.

Niedrach, L.W., "Electrodes for Potential Measurements in Aqueous Systems at High Temperatures and Pressures," Angewandte Chemie—International Edition in English, pp. 161-169, vol. 26, No. 3, Mar. 1987.

Uchino et al., "Study on the Practical Application of a Method for Corrosion Potential Measurement in a Water Quality Monitoring System used During Combined Water Treatment," PowerPlant Chemistry, pp. 511-517, vol. 3, No. 9, 2001.

Margulova, T. Kh. et al., "Conditions of dosing oxygen and hydrogen peroxide into the condensate of power units of supercritical parameters." (Abstract), Teploenergetika (Moscow), 55-9, (6) 1977.

Pike, T.H. et al., "An Improved Method for Monitoring Low Concentrations of Volatile Oxygen Scavengers," Iwc, pp. 64-67, Jan. 2008.

Dooley, B. et al., "ORP—The Real Story for Fossil Plants," PowerPlant Chemistry, pp. 5-15, 5 (1), 2003.

TBI-Bailey, pH/ORP Sensors for Process Monitoring, 1998, Elsag Bailey, p. 1-40.

Lvov et al., Advanced flow-through external pressure-balanced reference electrode for potentiometric and pH studies in high temperature aqueous solutions, 1998, Elsevier Science S.A., Journal of Electroanalytical Chemistry 443, p. 186-194.

* cited by examiner

METHOD OF DETECTING AND REDUCING CONTAMINATION IN PAPERMAKING BOILER SYSTEMS

CROSS REFERENCE TO RELATED APPLICATIONS

This application is a continuation in part of U.S. patent application Ser. No. 11/852,695, "Method and Device for Cleanup and Deposit Removal from Internal Hot Water System Surfaces," filed Sep. 10, 2007, now U.S. Pat. No. 7,998,352; and a continuation in part of U.S. patent application Ser. No. 11/852,616, "Method and Device for Preventing Corrosion in Hot Water Systems Undergoing Intermittent Operations, filed Sep. 10, 2007, now U.S. Pat No. 7,951,298; and a continuation in part of U.S. patent application Ser. No. 11/782,246, "Method and Device for Creating and Analyzing an At Temperature and Pressure Oxidation-Reduction Potential Signature in Hot Water Systems for Preventing Corrosion, filed Jul. 24, 2007, now U.S. Pat No. 7,955,853; each of which is incorporated herein by reference in its entirety.

TECHNICAL FIELD

This invention relates generally to methods of detecting contamination of boiler condensate and/or boiler feedwater. More specifically, the invention relates to detecting and reducing contamination of boiler condensate and/or boiler feedwater in an industrial process. The invention has particular relevance to detecting changes in condensate streams of papermaking processes related to corrosion of boiler system metals and chemical additives.

BACKGROUND

As a feedwater source, good quality condensate is preferred over other sources of makeup water because it does not create additional cost, thus avoiding the cost of softening, demineralizing, or heating other sources of makeup water. In particular, the heat content reduces fuel expenditures to generate the required steam load. Additional value exists in maximizing condensate return rates in paper mills that produce high absorbency products, such as tissue and towel products. In tissue- and towel-producing paper mills in particular, loading of various contaminants in the boiler feedwater creates problems in the system, particularly in the Yankee Dryer (i.e., the mechanical drum that forms the tissue or towel sheet). The nature of the Yankee Dryer produces substantial dissolved gases (e.g., $CO_2$) in the condensate stream. The source of the majority of the dissolved gas is introduced to the boiler system through the makeup water, so maximizing the condensate return minimizes the dissolved gas loading in the system, which in turn makes the Yankee Dryer condensate easier to manage.

Several potential downsides exist to the return of condensate in the paper mill system. Papermaking is, at times, a batch process with the batches being defined as different grades of paper that are produced at different times on the same paper machine. Both paper machines and Yankee Dryers operate under steam pressure, so when downtime occurs, the steam flow is shut down and the components that use the steam pressure cool. To prevent complete steam collapse and a vacuum condition in such components, vacuum breaker valves open to allow air into the space previously occupied by steam. The oxygen fraction of the introduced ambient air causes corrosion on the hot metal surfaces, producing iron oxide. The longer the paper or tissue machine is offline, the more this chemical reaction can proceed, and the more iron oxide is generated. In addition, thermal contraction and expansion stresses caused during the cool down and start-up of the paper machine causes existing metal oxide layers to crack and exfoliate exposing more fresh metal surfaces than can undergo oxygen attack and corrode. When the machine returns to operation, the flow of steam and condensate flushes across the metal surfaces where the iron oxides have formed, stripping away the oxide particles. These particles form additional contaminants in the condensate return flow.

The condensate, as mentioned above, is the preferred source of boiler feedwater. But when condensate contains iron oxide particles, the boiler is put at risk for developing waterside deposits. Initially, these particles form a deposit layer that resists heat transfer, making the boiler less thermally efficient. Eventually, the deposit layer thickens causing the boiler tubes to overheat and fail, requiring the boiler to be taken off line for repair. Other, more subtle effects of iron deposits in the boiler waterside also occur. It is the nature of iron oxide deposits to be porous or permeable, allowing water to pass through and concentrate next to the hottest locations adjacent to the flame and causes steam to evaporate and concentrate boiler water salts. In some cases, this concentration proceeds to the point where under deposit corrosion (methods of removing such deposits are disclosed in U.S. patent Ser. No. 11/852,695, "Method and Device for Cleanup and Deposit Removal from Internal Hot Water System Surfaces," currently pending) reactions take place, so that metals in the system (e.g., in the boiler tubes) dissolves via a mechanism referred to in the art as caustic corrosion or caustic embrittlement. The result is the same as for an overheat failure, the boiler must be taken off line for repair, at which time it is not available to generate steam for paper or tissue/towel drying, which curtails mill production and creates additional cost.

To minimize corrosion during both normal operating periods and downtime conditions, some mills feed chemical additives to the paper machine steam system. These chemicals are typically an oxygen scavenging, metal passivating/conditioning reducing agent mixed with a volatile alkaline amine, so that both the oxygen corrosion and acidic corrosion mechanisms are addressed. The current state of this technology is that there is no real time continuous monitoring and control capability to determine the corrosive nature of the paper machine condensate and make real time adjustments to the dosage of these chemical additives based on changing system conditions, even though it is known that the conditions are highly variable. A base feed dosage of the chemical additives are fed, and occasionally adjusted if grab samples or some other monitoring program is in place.

The papermaking industry has long sought to adapt equipment used for other water treatment purposes to provide continuous online information about condensate quality. For example, a control system that used turbidity to measure iron particles in condensate streams was accomplished by installing a turbidity meter on a flowing condensate sample in the area of the paper machine. This meter could then be used to activate a diversion valve when a sufficiently high concentration of particles was sensed. By analyzing grab samples for iron concentration, a correlation could be developed such that a preselected iron concentration could activate condensate dumping.

The use of turbidity measurement in managing the condensate iron concentration soon fell into disfavor. The equipment used to measure the sample's turbidity was designed for laboratory use, and could not withstand the conditions in the paper machine area. The turbidity meters required cooled sample for analysis, and the reliability of sample coolers in the process area proved to be a problem. Moreover, seasonal changes in the cooling water temperature that the mill provided were a problem. If the cooling water got too warm, the sample was not sufficiently cooled, and the optics used to detect the turbidity fogged over, making the results unreliable. Despite efforts to provide design solutions for these issues, the turbidity measurement of condensate iron concentrations as an online monitoring tool was abandoned after only a few years of use.

Standards for condensate monitoring today in the paper industry is represented by two approaches. First, in addition to iron particles, ionic solutions such as concentrated cooking liquors can contaminate condensate from time to time. As a solution, the industry has adopted a version of conductivity-based dumping or diversion system, whereby the detection of excessive conductivity in a sample will trigger the diversion system. Such a system is effective only to prevent significant ionic contamination events, but iron particles do not elevate the condensate conductivity sufficiently to provide detection. Second, manual testing of the condensate following downtime conditions is used to determine when the iron concentration is tolerable for use as boiler feedwater. By its nature, such manual testing is amenable to a substantial degree of variability making it difficult for precise control to be achieved. In most cases the condensate is dumped for a longer period than is technically required, creating additional costs for lost condensate and the concomitant need for increased makeup water and accompanying processing.

There thus exists a need in the papermaking industry to improve performance and efficiency of returning high quality condensate as a source of boiler feedwater. A particular need exists for improved online methods of optimizing injections of chemical additives into the boiler feedwater and steam/condensate system.

SUMMARY

This invention accordingly provides a method for detecting contamination of a boiler condensate and/or a boiler feedwater in a papermaking process. The method includes measuring an oxidation-reduction potential ("ORP") at one or more locations in the boiler condensate and/or the boiler feedwater of the papermaking process with one or more devices capable of measuring ORP at operating temperature and pressure (referred to herein as a "CSM device"). The CSM device is preferably in communication with a controller that is operable to assessing whether the measured ORP or a calculated ORP based upon the measured ORP is within an optimum range. If the measured ORP or the calculated ORP is not within the optimum range, the controller causes transmission of a signal to direct feeding an effective amount of one or more reductants and/or one or more pH-controlling chemicals into the boiler feedwater and/or one or more a satellite feed locations of the papermaking process.

In another aspect, the invention is a system for detecting contamination of boiler condensate and/or boiler feedwater in a papermaking process. The system includes a controller in communication with at least one device capable of measuring ORP in a condensate stream derived from a steam generator of an online and operating papermaking process. At least one chemical injection pump is used to inject at least one reductant and/or pH-controlling chemical into a boiler feedwater and/or one or more satellite feed locations triggered by a signal received from the controller in relation to the measured ORP and operation of the chemical injection pump. A thermodynamic connection is formed by an interface between the papermaking machine and a steam and/or condensate stream (e.g., Yankee Dryer) derived from the boiler or steam generator. The system further includes a condensate return line and a condensate discarding system (e.g., dump valve).

This invention also provides a novel method of managing condensate streams associated with papermaking processes through the use of a Corrosion Stress Monitor ("CSM"). The invention has particular utility in its capability of minimizing corrosion in condensate systems of hot water systems used in papermaking processes, with specific benefits to those processes producing tissue or towel paper grades. In a preferred embodiment, the CSM is operable to measure the oxidation-reduction potential at operating temperature and pressure (such measurements are sometimes referred to herein as "ORP"). In conjunction with a controller system, a CSM installed on a flowing or offline condensate stream detects the condition of the metal in the system to optimize the application of both passivating and online chemical additive treatment programs. The scope of the method includes the ability to generate reliable condensate stream data and use that data in a feedback, feed-forward, or predictive loop(s) to make real-time adjustments to chemical additive treatments thus increasing the quality of the feedwater.

In a preferred aspect, the invention is implemented to provide continuous or intermittent feedback, feed-forward, or predictive information to process chemical injection pumps to make real-time adjustments. The invention incorporates programming logic to convert analyzer signals to pump adjustment logic and, in a preferred embodiment, controls one or each of a plurality of chemical injections with a unique basis. It is also envisioned that the invention may also manage and integrate readings from existing electrical resistance corrosion probes, linear polarization probes, and/or other techniques for measuring metal loss. In an embodiment, these readings will be programmed through, for example, a Programming Logic Controller (PLC) to possibly override or modify the other chemical inputs and change pump rates.

When downtime conditions occur, the CSM is capable of optimizing the feed of passivating treatment, which allows for online sensing of the metal condition as a result of the water chemistry present. If, as would be the case when the condensate contains some oxygen as a result of the downtime conditions, the CSM would sense this condition and the controller component would send a signal to one or more chemical injection pumps to increase the dosing of the chemical additives (e.g., combined reducing agent/amine) to restore protective conditions to minimize corrosion.

Though condensate sampling (via online exposure to the CSM) may occur at any point in the flow path, the ORP of the condensate at the end of the process flow path is typically indicative of the chemical conditions in the system. System turnover is generally at a sufficient rate such that the dosage being fed would not be excessive during these conditions, plus the application of additional chemical feed can be managed by careful selection of the size of the injection pump. Preferably, the CSM is exposed to a liquid stream that is representative of the performance in the entire system. Typically, such exposure takes place at the beginning of a particular phase in the system, rather than further downstream. Ideal exposure takes place in a flowing sample stream that is well-mixed. It should, however, be understood that the CSM may be located at any suitable location.

It is an advantage of the invention to maximize the volume and optimize the presence of chemical additives in condensate water that can be returned to the paper mill boiler as a feedwater source.

It is another advantage of the invention to provide a robust method of optimizing condensate recycling to the boiler feedwater by measuring properties of the condensate water at operating temperature and pressure and incorporating these measurements into a feedback, feed-forward, or predictive control loop.

It is a further advantage of the invention is to provide a means of eliminating or reducing the lag time associated with conventional condensate measurement systems by enabling measurement of condensate properties at operating temperature and pressure.

An additional advantage of the invention is to provide optimized control over chemical additives being fed to papermaking machines thereby minimizing the generation and return of corrosion by-product particles that threaten steam generator reliability and safety.

Still another advantage of the invention is to provide a method of measuring condensate properties online and in essentially real-time and possibly avoiding the cost of sample conditioning systems.

A further advantage of the invention is to reduce the potential safety and environmental risks resulting from contaminated condensate by minimizing the volume of discarded water.

It is yet another advantage of the invention to provide a method for determining and predicting the potential of engineering alloys (including iron and steel such as mild steel) to corrode in the papermaking boiler systems.

Additional features and advantages are described herein, and will be apparent from, the following Detailed Description, Figures, and Examples.

DETAILED DESCRIPTION

Figure 1:
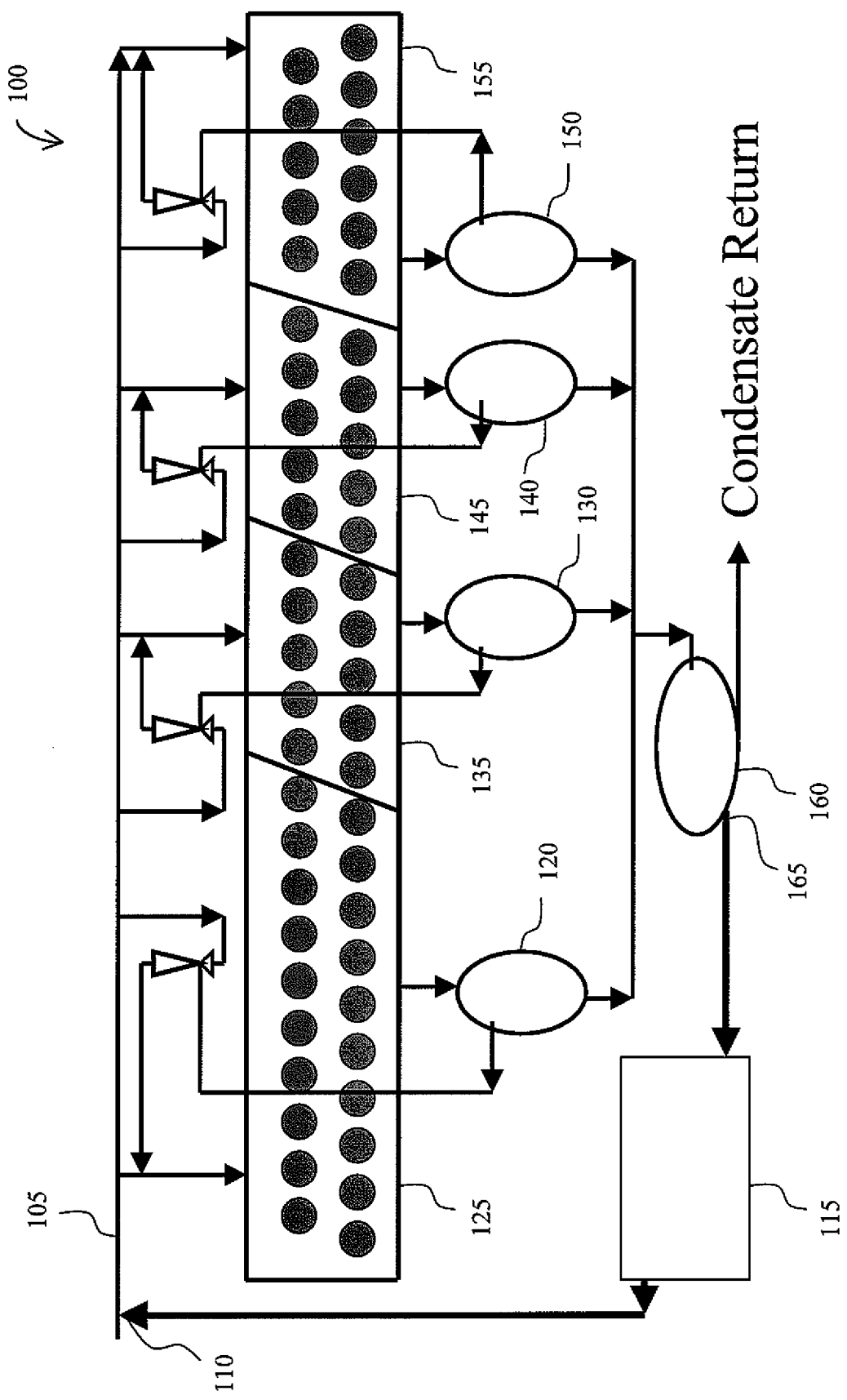
FIG. 1 illustrates a typical paper machine dryer section configuration including a preferred embodiment of the invention showing the position for the corrosion stress monitor.

Referring to FIG. 1, a preferred embodiment of the invention in a typical papermaking process 100 is illustrated. In this typical process, the use of thermocompressors allows each section of the process to operate independently. Steam supply 105 (typically around 175 psi steam pressure) travels from the steam generator or boiler (not shown) and is distributed to main dryer section 125, felt dryer section 135, first dryer section 145, and lead dryer section 155. The cooled steam (i.e., condensate) then travels through main dryer separator 120, felt dryer separator 130, first dryer separator 140, and lead dryer separator 150. The condensate collects in main receiver 160, where one or more CSM devices are positioned at location 165. The condensate returns to the feedwater (not shown) via the path labeled "Condensate Return." ORP signals captured by the CSM device at location 165 are transmitted to controller 115, which in turn determines if any additional chemistry (e.g., reductants, amines, pH controlling agents, etc.) are to be added to satellite feed point 110 and is operable to transmit such data or instructions (either directly or through an intermediary controller or device) to satellite feed point 110.

Figure 2:
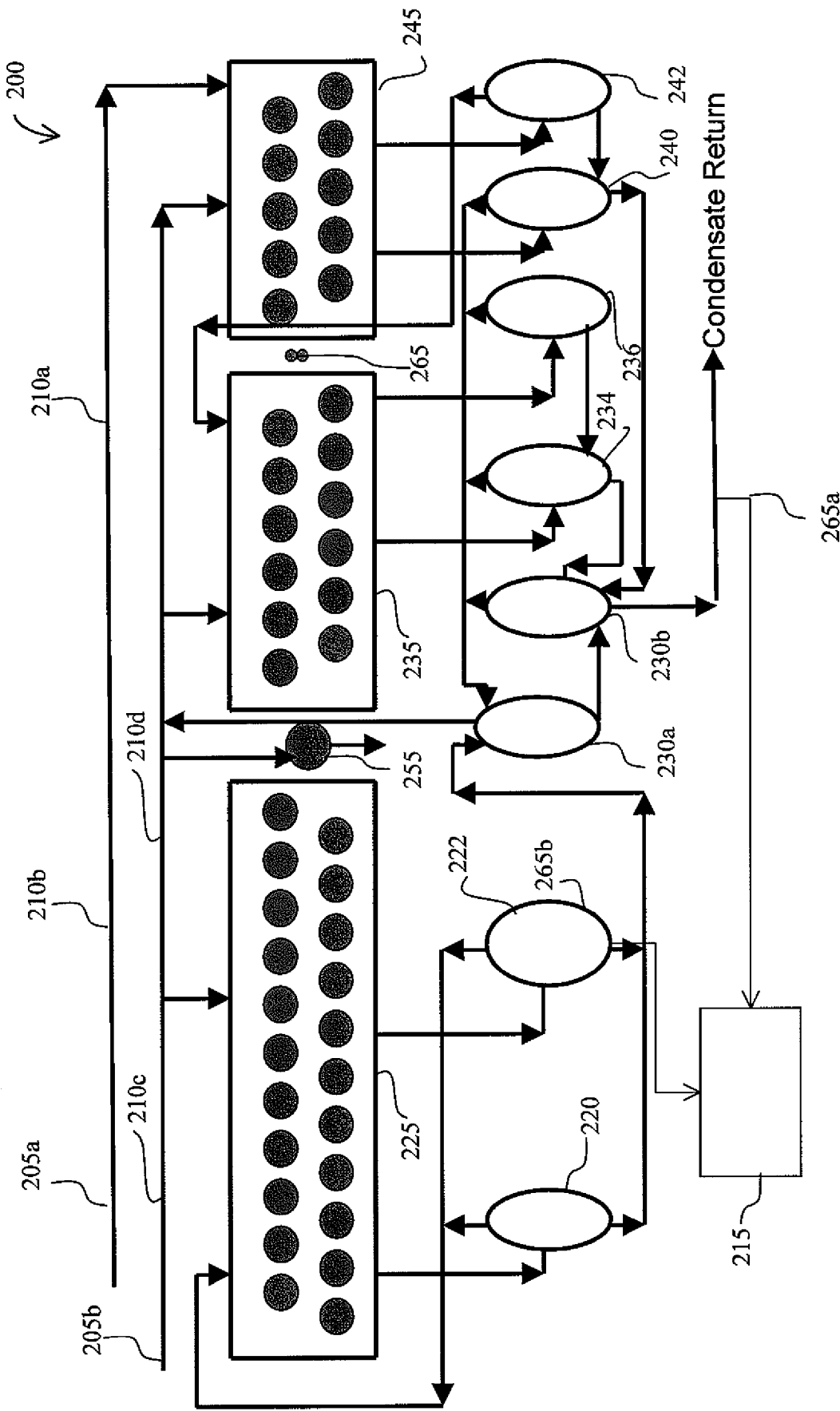
FIG. 2 illustrates an exemplary cascading condensate system design including preferred embodiments of the invention showing the position for the corrosion stress monitor.

FIG. 2 shows an embodiment of the invention in cascading condensate system 200. As is known in the art, this type of system cascades flash steam, thus allowing $CO_2$ concentrations to elevate and depressing condensate pH. High pressure steam supply 205a (attemperation water typically around 175 psi steam pressure) and low pressure steam supply 205b (typically around 55 psi steam pressure) travels from the steam generator or boiler (not shown) and is distributed (with respect to high pressure stream supply 205a) to third dryer section 245 and (with respect to low pressure steam supply 205b) to first dryer section 225, second dryer section 235, third dryer section 245, and creping dryer 255. The cooled steam (i.e., condensate) then travels through an array of components on its way back to the feedwater for the steam generator (not shown). In the illustrated system, the array of components includes first dryer section condensation tank 220 and first section main dryer tank 222; second dryer section flash dryer tank 234 and second dyer section main dryer tank 236; third dryer section flash dryer tank 240 and third dryer section main dryer tank 242; and receiver tanks 230a and 230b.

The condensate returns to the feedwater (not shown) via the path labeled "Condensate Return." ORP signals captured by the CSM device at one or more of locations 265a and/or 265b are transmitted to controller 215, which in turn determines if any additional chemistry (e.g., reductants, amines, pH controlling agents, etc.) are to be added to satellite feed point(s) 210a, 210b, 210c, and/or 210d. Controller 215 is operable to transmit such data or instructions (either directly or through an intermediary controller or device) to the satellite feed point(s).

It should be appreciated that the present invention is applicable in any papermaking process where a boiler system is utilized. The invention has particular utility in papermaking processes that produce tissue or towel grades of paper due to the use of Yankee Dryers that are reliant on a steam source. Such grades of paper are produced using various methods known in the art. One example is disclosed in U.S. patent application Ser. No. 11/564,946, "Method of Applying a Super-Absorbent Composition to Tissue and Towel Substrates," currently pending.

Figure 3:
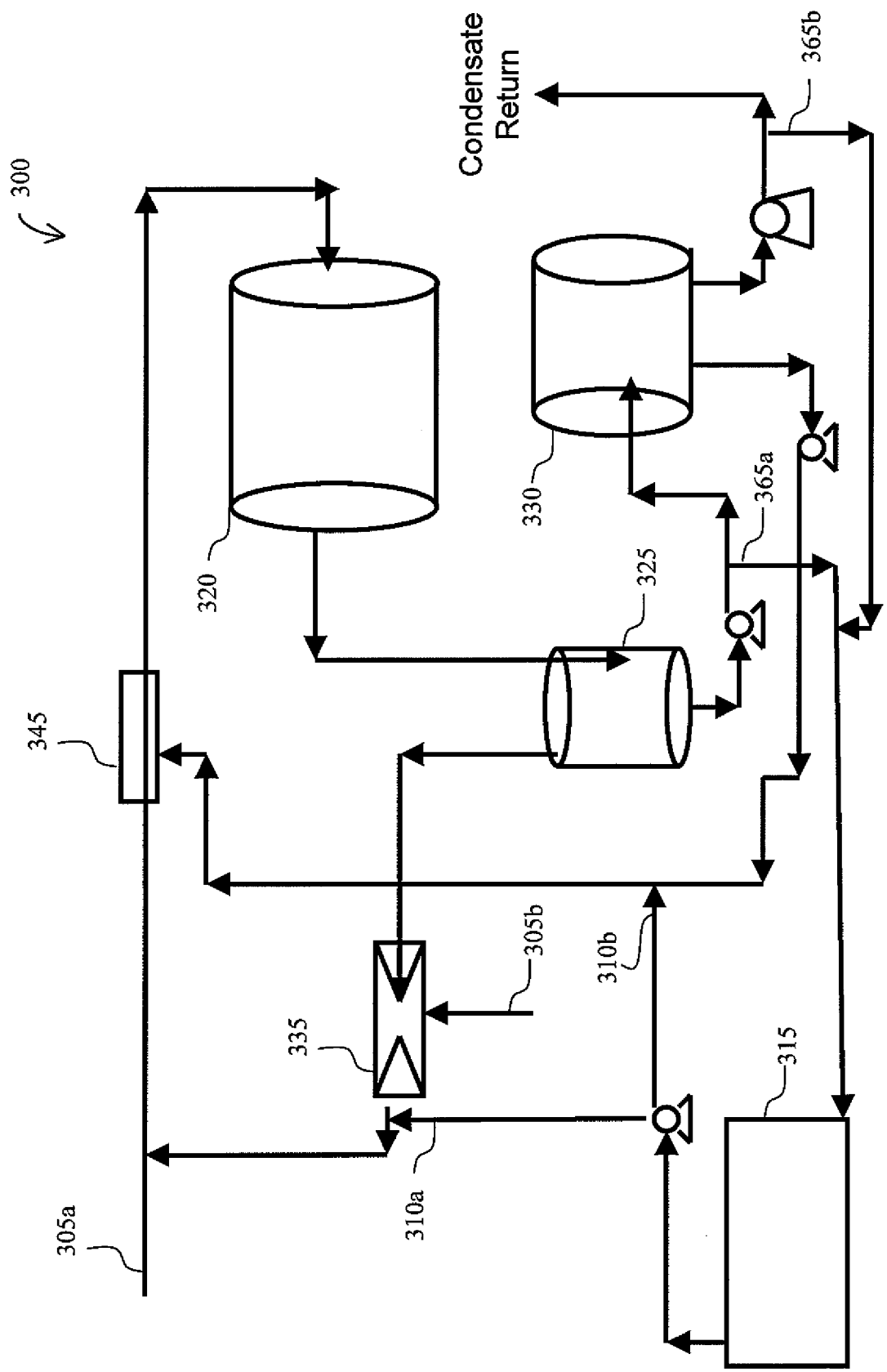
FIG. 3 displays a preferred embodiment of the invention as applied in a tissue or towel grade papermaking process.

FIG. 3 shows an illustrative embodiment of a tissue or towel grade papermaking process 300. This type of system typically includes two steam sources, low pressure steam source 305a (generally about 170 psi steam pressure) and high pressure steam source 305b (generally around 600 psi steam pressure). In this embodiment, low pressure steam 305a travels from the steam generator (not shown) to desuperheater 345 and through Yankee Dryer 320. The cooled steam exits Yankee Dryer 320 and travels through Yankee separator 325, which is further diverted to thermocompressor 335 and flash tank 330.

The condensate returns to the feedwater (not shown) via the path labeled "Condensate Return." ORP signals captured by the CSM device at one or more of locations 365a and/or 365b are transmitted to controller 315, which in turn determines if any additional chemistry (e.g., reductants, amines, pH controlling agents, etc.) are to be added to satellite feed point(s) 310a and/or 310b. Controller 315 is operable to transmit such data or instructions (either directly or through an intermediary controller or device) to the satellite feed point(s).

The described systems and locations for the CSM devices and satellite feed points are only exemplary and any other suitable location may be used as determined by a skilled artisan. It should be appreciate that, for example, satellite feed location for introducing the described chemistries may include the paper machine steam header, low pressure attemperation water (as in FIG. 2), condensate return, feedwater, or any other suitable location.

In a preferred embodiment, the method of the invention includes a controller operable to receive and process information and provide instructions to various components (e.g., chemical injection pumps). The term "controller" refers to a manual operator or an electronic device having components such as a processor, memory device, digital storage medium, cathode ray tube, liquid crystal display, plasma display, touch screen, or other monitor, and/or other components. The controller is preferably operable for integration with one or more application-specific integrated circuits, programs, computer-executable instructions or algorithms, one or more hard-wired devices, wireless devices, and/or one or more mechanical devices. Moreover, the controller is operable to integrate the feedback, feed-forward, or predictive loop(s) of the invention. Some or all of the controller system functions may be at a central location, such as a network server, for communication over a local area network, wide area network, wireless network, internet connection, microwave link, infrared link and the like. In addition, other components such as a signal conditioner or system monitor may be included to facilitate signal transmission and signal-processing algorithms.

Preferably, the controller includes hierarchy logic to prioritize any measured or predicted properties associated with measured system parameters. For example, the controller may be programmed to prioritize ORP measurements received from certain parts of the system over others. It should be appreciated that the object of such hierarchy logic is to allow improved control over the system parameters and to avoid circular control loops.

In one embodiment, the method includes an automated controller. In another embodiment, the controller is manual or semi-manual. For example, where the papermaking process includes one or more datasets received from various sensors in the system, the controller may either automatically determine which data points/datasets to further process or an operator may partially or fully make such a determination. A dataset from a papermaking process, for instance, may include variables or system parameters such as oxidation-reduction potential, pH, levels of certain chemicals or ions (e.g., determined empirically, automatically, fluorescently, electrochemically, colorimetrically, measured directly, calculated), temperature, pressure, process stream flow rate, dissolved or suspended solids, etc. Such system parameters are typically measured with any type of suitable data capturing equipment, such as pH sensors, ion analyzers, temperature sensors, thermocouples, pressure sensors, corrosion probes, and/or any other suitable device or method. Data capturing equipment is preferably in communication with the controller and, according to alternative embodiments, may have advanced functions (including any part of the control algorithms described herein) imparted by the controller.

Data transmission of measured parameters or signals to chemical pumps, alarms, or other system components is accomplished using any suitable device, such as a wired or wireless network, cable, digital subscriber line, internet etc. Any suitable interface standard(s), such as an ethernet interface, wireless interface (e.g., IEEE 802.1a/b/g/x, 802.16, Bluetooth, optical, infrared, radiofrequency, etc.), universal serial bus, telephone network, the like, and combinations of such interfaces/connections may be used. As used herein, the term "network" encompasses all of these data transmission methods. Any of the described devices (e.g., plant archiving system, data analysis station, data capture device, process station, etc.) may be connected to one another using the above-described or other suitable interface or connection.

In at least one embodiment, the control logic is structured to control chemical feed at varying rates depending on the system cycle. For example, if a paper machine has just come offline, a signal initiates chemistry feed at a predetermined rate according to a schedule. When brought back online, a signal initiates chemical feed at the same or a different level for a period. A third algorithm is used for corrosion control during normal operation. With such a multi-algorithm approach, the paper machine duty cycle is actively controlled at various levels based upon real-time CSM data and also time-based data related to system operations.

In an embodiment, system parameter information is received from the system and archived. In another embodiment, system parameter information is processed according to a timetable or schedule. In a further embodiment, system parameter information is immediately processed in real-time/substantially real-time. Such real-time reception may include, for example, "streaming data" over a computer network.

According to alternative embodiments, the CSM is operable to detect even minor variations in the level of system corrosion protection during normal operating periods, so that corrosion product generation is continuously minimized. Though any suitable device may be used to detect ORP as an indicator of the level of system corrosion protection, preferred devices include those disclosed in U.S. patent application Ser. No. 11/403,420, titled "Method of Inhibiting Corrosion in Hot Water Systems" and Ser. Nos. 11/668,048 and 12/114,288, "High Temperature and Pressure Oxidation-Reduction Potential Measuring and Monitoring Device for Hot Water Systems." The controller then determines whether any such variations require an adjustment to the chemical additives in the feedwater.

Such additives may include changes and adjustments to feedwater, satellite feeding location, and/or steam condensate chemistry. For example, the changes may include adding oxygen or one or more oxygen scavengers to the feedwater, satellite feeding location, and/or steam condensate. By definition, oxygen scavengers are reducing agents (reductants), although not all reducing agents are necessarily oxygen scavengers. For practical applications, reasonable reactivity is required at low temperatures. That is, there should be some favorable kinetics of reaction. Furthermore, other changes and adjustments to the system water chemistry, such as for system control and corrosion control, may include adding other oxidizing agents (oxidants) or other reducing agents (reductants).

Preferably, the present invention includes adjusting the chemical additives based on amount of reducing agent added to the feedwater, satellite feeding location, and/or steam condensate. The term "reductant" refers to any chemical capable of reacting as a reducing agent. Representative non-limiting examples of reductants include hydrazine, sulfite, carbohyrazide, N,N-diethylhydroxylamine, hydroquinone, erythorbate, methyl ethyl ketoxime, hydroxylamine, tartronic acid, ethoxyquin, methyltetrazone, tetramethylphenylenediamine, semi-carbazides, diethylaminoethanal, 2-ketogluconate, N-isopropylhydroxylamine, ascorbic acid, gallic acid, and hydroxyacetone.

In at least one embodiment, the invention includes controlling an amount of pH-controlling chemical added to the feedwater or satellite feeding site. "pH-controlling chemical" means any suitable chemical or compound that, when added to a solution, composition, and/or formulation, is capable of adjusting pH, controlling pH, and/or maintaining pH. Representative pH-controlling chemicals include ammonia and amines, such as cyclohexamine, morpholine, diethylaminoethanol (DEAE), methoxypropylamine, monoethanolamine, the like, and combinations thereof.

When downtime conditions occur, the CSM is capable of optimizing the feed of metal passivating treatment(s) until the metal state returns to the preferred low corrosion conditions. One illustrative example of the importance of downtime corrosion protection in hot water systems generally is provided in U.S. application Ser. No. 11/852,616, titled, "Method and Device for Preventing Corrosion in Hot Water Systems Undergoing Intermittent Operations," currently pending.

The foregoing may be better understood by reference to the following examples, which are intended for illustrative purposes and are not intended to limit the scope of the invention.

EXAMPLE 1

The measurement and control of a tissue or paper mill condensate system has not yet been attempted using the CSM approach. But the application of chemical additives to suppress corrosion is in use at a number of paper mills. The improved control resulting from the deployment of the CSM controller will improve either or both of 1) the performance of the chemical additive by applying to a predetermined performance level of ORP, or 2) the economics of the applications, which cannot be currently optimized using existing monitoring capabilities. The best we can do at this time is refer to current applications of a chemical additive program, and then expect that either or both of the improvements cited above will be achieved when the control methodology is deployed.

EXAMPLE 2

Figure 4:
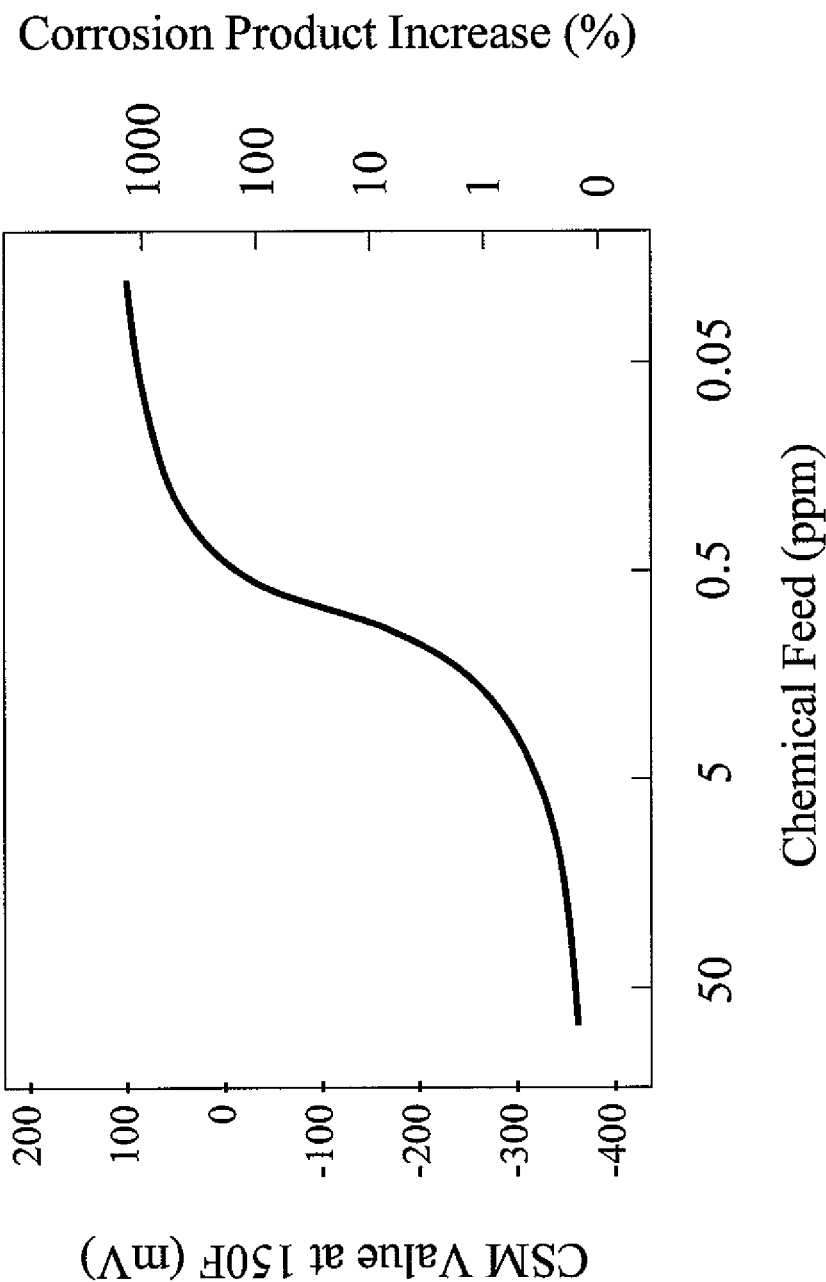
FIG. 4 illustrates the impact of varying at temperature and pressure ORP values on corrosion product increase in the system in relation to an amount of chemistry fed.

This Example illustrates a theoretical scenario of chemical feed to achieve or maintain an ORP setting range in relation to an amount of chemistry fed and the potential of corrosion product increase of the system. An amount of chemistry that needs to be fed into the system to achieve a desired CSM (i.e., at temperature and pressure ORP) range is shown on the x-axis in the graph of FIG. 4. The desired ORP range is shown on the Y1-axis. The Y2-axis shows the amount of corrosion product increase that would be expected at varying at temperature and pressure ORP levels. It is apparent that these ORP values are predictive of corrosion product increase and that adjustments to the ORP via the controller will have an impact on such corrosion products.

EXAMPLE 3

Figure 5:
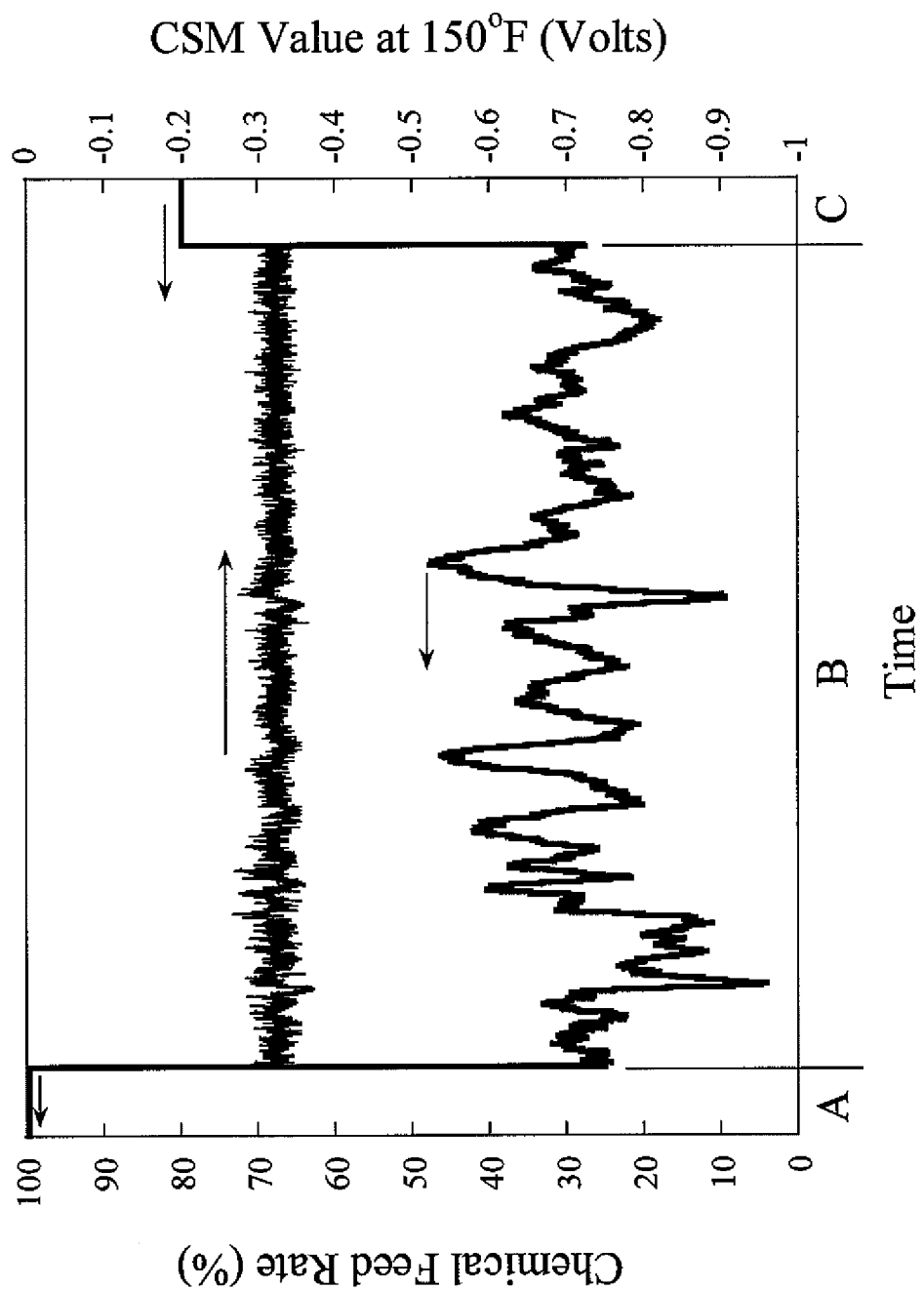
FIG. 5 illustrates a 3-phase control scheme capable of minimizing corrosion and corrosion product transport.

This Example illustrates the possible use of a timed and CSM control scheme to minimize corrosion and corrosion product transport in the system. During startup, a paper machine may be pumped with reductant or other chemistry at 100% for 2-hours (designated as Phase A on the X-axis of FIG. 5). In Phase B, the chemical feedrate is controlled via input from the CSM to achieve a set point of −325 mV (within a small range). It should be appreciated that the set point/range is normally determined for each unique application by a skilled artisan. If the paper machine is shut down (e.g., for maintenance, etc. or due to a paper break), the control sequence may pump chemical at 80%, as shown in Phase C. It may be seen in FIG. 5 that such a sequence may lead to the minimization of in situ corrosion and corrosion product release to the condensate stream.

EXAMPLE 4

This example illustrates the significant industry need for the instant invention. Under conventional technology, boiler systems of papermaking processes are not sufficiently well-controlled. On larger papermaking machines, the internal surface area vulnerable to corrosion is tremendous (equivalent, more or less, to the internal surface area of a 17-mile length of 2-inch internal diameter pipe). Even if current methods offer generally good corrosion control, the remaining level of corrosion can still result in a sufficient mass of iron oxide or other corrosion by-product material to be transferred to the boiler system such that a deposition problem could result.

While this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any and all possible combinations of some or all of the various embodiments and characteristics described herein. Any and all patents, patent applications, scientific papers, and other references cited in this application, as well as any references cited therein, are hereby incorporated by reference in their entirety.

It should be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The claimed invention is:

1. A method of detecting contamination of a boiler condensate in a papermaking process, the method comprising:
    (a) measuring an oxidation-reduction potential ("ORP") at operating temperature and pressure at one or more locations in the boiler condensate of the papermaking process after steam has traveled from a steam generator and through at least one dryer section with one or more CSM device capable of measuring ORP at operating temperature and pressure, wherein the CSM device is in contact with the boiler condensate and in operable communication with a controller;
    (b) assessing the measured ORP or a calculated ORP based upon the measured ORP is within an optimum range;
    (c) comparing the measured or calculated ORP to an optimum ORP;
    (d) transmitting a signal from the controller to feed an effective amount of one or more reductants and/or one or more pH-controlling chemicals into the boiler feedwater and/or one or more satellite feed locations of the papermaking process to adjust the ORP.

2. The method of claim 1, wherein the satellite feed location is selected from the group consisting of: paper machine steam header, low pressure attemperation water, condensate return, feedwater, and combinations thereof.

3. The method of claim 1, including transmitting the measured ORP or the signal wirelessly.

4. The method of claim 1, wherein the optimum range is user-defined.

5. The method of claim 1, including operating the method continuously, automatically, and/or online.

6. The method of claim 1, including operating the method intermittently.

7. The method of claim 1, including a mechanism to open or close one or more valves associated with the boiler condensate.

8. The method of claim 1, wherein the reducant is hydrazine, sulfite, carbohyrazide, N,N-diethylhydroxylamine, hydroquinone, erythorbate, methyl ethyl ketoxime, hydroxylamine, tartronic acid, ethoxyquin, methyltetrazone, tetramethylphenylenediamine, semi-carbazides, diethylaminoethanal, 2-ketogluconate, N-isopropylhydroxylamine, ascorbic acid, gallic acid, or hydroxyacetone.

9. The method of claim 1, wherein the pH-controlling chemical is ammonia or an amine.

10. The method of claim 9, wherein the amine is cyclohexamine, morpholine, diethylaminoethanol ("DEAE"), methoxypropylamine, or monoethanolamine.

11. The method of claim 1, wherein the one or more reductants and/or one or more pH-controlling chemicals is pumped into the papermaking process according to Phase A and Phase B, and optionally Phase C;
   wherein Phase A is defined as pumping the one or more reductants and/or one or more pH-controlling chemicals into the papermaking process at 100% for 2-hours;
   wherein Phase B is defined as controlling the chemical feedrate of the one or more reductants and/or one or more pH-controlling chemicals via input from the CSM device to achieve a set point;
   wherein Phase C is defined as pumping the one or more reductants and/or one or more pH-controlling chemicals into the papermaking process at 80%.

12. The method of claim 11, wherein the set point is −325 mV.

13. The method of claim 1, wherein the papermaking process comprises a steam supply that travels from a steam generator or boiler and is distributed to a main dryer section, a felt dryer section, a first dryer section, and a lead dryer section;
   wherein cooled steam in the papermaking process travels through a main dryer separator, a felt dryer separator, a first dryer separator, and a lead dryer separator; and
   wherein condensate in the papermaking process collects in a main receiver, wherein the one or more installed CSM devices are in contact with the condensate in the main receiver.

14. The method of claim 1, wherein papermaking process comprises a high pressure steam supply and a low pressure steam supply that travel from a steam generator or boiler;
   wherein the high pressure steam supply is distributed to a third dryer section;
   wherein the low pressure steam supply is distributed to a first dryer section, a second dryer section, the third dryer section, and a creping dryer;
   wherein cooled steam in the papermaking process travels through a first dryer section condensation tank and a first section main dryer tank, a second dryer section flash dryer tank and a second dryer section main dryer tank, a third dryer section flash dryer tank and a third dryer section main dryer tank, and receiver tanks.

15. The method of claim 1, wherein the papermaking process comprises a low pressure steam source and a high pressure steam source;
   wherein the low pressure steam travels from a steam generator to a desuperheater and through a Yankee Dryer;
   wherein cooled steam exits the Yankee Dryer and travels through a Yankee separator, which is further diverted to a thermocompressor and flash tank.

16. The method of claim 1, wherein the optimum ORP range is defined as −375 mV to −200 mV.

17. The method of claim 1, wherein the effective amount is from 0.5 ppm to 50 ppm.

* * * * *